(12) United States Patent
Argo

(10) Patent No.: US 10,373,505 B2
(45) Date of Patent: Aug. 6, 2019

(54) METHOD AND SYSTEM FOR FAST UPLOAD OF AUTONOMOUS MISSION PLANS IN UNMANNED AERIAL VEHICLES

(71) Applicant: AUTEL ROBOTICS CO., LTD., Shenzhen, Guangdong (CN)

(72) Inventor: Ken Argo, Guangdong (CN)

(73) Assignee: AUTEL ROBOTICS CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/831,999

(22) Filed: Dec. 5, 2017

(65) Prior Publication Data

US 2019/0172359 A1 Jun. 6, 2019

(51) Int. Cl.
*G08G 5/00* (2006.01)
*B64C 39/00* (2006.01)
*B64C 39/02* (2006.01)

(52) U.S. Cl.
CPC ......... *G08G 5/0034* (2013.01); *B64C 39/024* (2013.01); *G08G 5/0039* (2013.01); *G08G 5/0069* (2013.01); *B64C 2201/126* (2013.01); *B64C 2201/141* (2013.01); *B64C 2201/146* (2013.01)

(58) Field of Classification Search
CPC .. G08G 5/0034; G08G 5/0039; G08G 5/0069; B64C 39/024; B64C 2201/126; B64C 2201/141; B64C 2201/146

USPC ............................................................ 701/3
See application file for complete search history.

(56) References Cited

U.S. PATENT DOCUMENTS

| | | | |
|---|---|---|---|
| 9,599,994 B1* | 3/2017 | Bogdanowicz | G05D 1/104 |
| 2016/0093221 A1* | 3/2016 | Bailey | G08G 5/0039 701/120 |
| 2017/0285627 A1* | 10/2017 | Feldmann | H04B 7/1851 |
| 2018/0079530 A1* | 3/2018 | Wyrobek | B64C 39/024 |

* cited by examiner

*Primary Examiner* — Marthe Y Marc-Coleman
(74) *Attorney, Agent, or Firm* — Ladas & Parry LLP

(57) ABSTRACT

A system and method for rapidly modifying flight mission plans for unmanned aerial vehicles (UAVs) is described. This includes a programming controller that requests the name of the existing flight mission in the UAV. When the requested name of the existing flight mission in the UAV is found to be the same name as that of the desired flight mission in the programming controller then the UAV is simply enabled by the programming controller to carry out the desired flight mission. When the requested name of the existing flight mission in the UAV is found not to be the same name as the modified flight mission in the programming controller then the programming controller creates and provides instructions to the UAV for rapidly updating the existing flight mission into the desired flight mission. These rapid updating instructions are similar to currently used ways of synchronizing personal computers in point-in-time procedures.

10 Claims, 1 Drawing Sheet

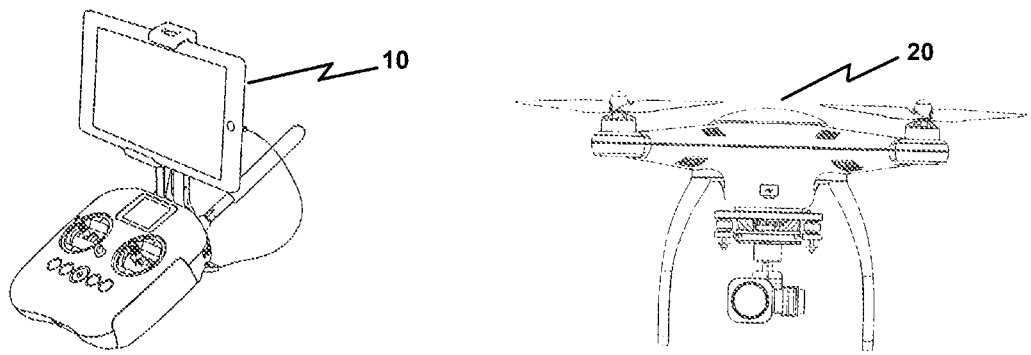

METHOD AND SYSTEM FOR FAST UPLOAD OF AUTONOMOUS MISSION PLANS IN UNMANNED AERIAL VEHICLES

FIELD OF INVENTION

This invention relates generally to the field of autonomous flight operations and more particularly to providing a method and system for rapid modification of mission flight plans in unmanned aerial vehicles.

BACKGROUND

Fight operations of unmanned aerial vehicles (UAVs) can be defined as a series of sequential operational procedures for reaching and for performing various tasks at a plurality of corresponding waypoints. The total number of waypoints can constitute a given mission flight plan. Uploading coded instructions to program an UAV to carry out any given mission flight plan usually takes place prior to flying the UAV. Uploading a given mission flight plan can be achieved by providing a single data package or a data matrix that contains all the necessary location information plus any additional information needed to complete and to perform the given mission flight plan. The requisite time needed to program and to subsequently upload coded instructions to a UAV for a given mission flight plan varies depending on the size and complexity of the mission flight plan itself.

Presently the typical time to program and to subsequently upload a relatively simple mission flight plan to an UAV can be as short as less than one minute, mainly because most of today's UAVs can only support relatively simple mission flight plans. However in the future, it is expected that UAVs capabilities will become considerably more robust than today's and as a consequence it is expected that the time needed to program and to upload these types of more complex flight missions will increase substantially.

It is recognized that it is possible that higher communications speeds can achieve some relief in reducing upload times but even at higher communication speeds this may still be unsatisfactory.

Presently there are no feasible solutions that are capable of overcoming the time constraints associated with programming and subsequently uploading programming instructions to UAVs so that the UAV can carry out highly complex mission flight plans. This is because presently uploading UAV mission flight plans require the entire operational details for each mission flight plan to be serially uploaded.

The present innovation is oriented to uploading instructions to the UAV from a programming controller that are minimally necessary to modify and/or to upgrade a mission flight plan already in the UAV so that the mission flight plan in the UAV is efficiently converted to match a modified mission flight plan built in a controller. This type of problem is especially aggravating when a given complex mission flight is only slightly modified which is expected to be commonly encountered in most professional use scenarios.

The present innovation discloses a method and a system designed to eliminate or at least substantially reduce these types of burdensome constraints associated with upgrading and/or uploading an entire complex mission flight plan from a controller into a UAV.

SUMMARY

The presently disclosed innovation overcomes a number of the shortcomings of the prior art by providing a means for rapidly modifying mission flight plans in unmanned aerial vehicles.

One aspect of the presently disclosed innovation provides a method of programming an unmanned aerial vehicle to perform autonomous flight operations in accordance to the operational procedures of preparing, querying, outputting generating, uploading, and enabling. In this aspect the preparing procedure includes preparing, at a programming controller, an updated mission flight plan that comprises an updated mission identification, updated sequential destination operations, and updated waypoint identifications. In this aspect the querying procedure includes querying from the programming controller to the UAV to output a stored mission identification, wherein the UAV comprises a stored mission flight plan that comprises the stored mission identification, stored sequential destination operations, and stored waypoint identifications. In this aspect the outputting procedure includes outputting from the UAV to the programming controller the stored mission identification. In this aspect the generating procedure includes generating instructions, at the programming controller, for modifying the stored mission flight plan to match that of the updated mission flight plan when the outputted stored mission identification does not match that the updated mission identification. In this aspect the uploading procedure includes uploading the generated instructions to the UAV from the programming controller for modifying the stored mission flight plan in the UAV to matches the updated mission flight plan in the programming controller. In this aspect the enabling procedure includes enabling the UAV to perform autonomous flight operations in accordance to the stored mission flight plan when the programming controller determines that the outputted stored mission identification matches that of the updated waypoint identification.

Another aspect of the presently disclosed innovation provides a system for programming an UAV to perform autonomous flight operations, in which the system includes a programming controller (1) and a UAV (20) as depicted in FIG. 1.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

An example embodiment of the disclosed system is described hereinbelow with reference to the following drawing:

FIG. 1 is a perspective view of an embodiment of the system that includes the programming controller and the UAV.

DETAILED DESCRIPTION

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The present innovation is also envisioned to be able to assign a key or GUID (global unique identifier) to each waypoint in the mission flight plan. Then a flight mission can be set to activate this "key" and can be sent to the UAV as a query, asking of the flight mission if the corresponding mission flight plan is present in the UAV memory. A positive answer would indicate that the mission flight plan is unchanged and as a consequence the UAV can be enabled to carry out the given mission flight plan immediately.

For example, as shown in Table 1 which depicts a typical mission flight plan known in the prior art that includes the following performance information values of latitude, longitude, altitude, and heading. It is also known that prior art flight missions may also include additional operational information that may also be included. However at the moment only minimal information is shown to focus on the innovative idea of the present invention.

TABLE 1

Operational Details of a Prior Art Example of a Mission Flight Plan

| Latitude | Longitude | Altitude | Heading |
|---|---|---|---|
| 31.993288 | 34.793873 | 60 | 103 |
| 31.993449 | 34.79396 | 60 | 126 |
| 31.993569 | 34.794112 | 60 | 148 |
| 31.993631 | 34.794307 | 60 | 171 |
| 31.993624 | 34.794515 | 60 | −167 |
| 31.99355 | 34.794704 | 60 | −144 |

Also as illustrated in Table 1, since there is nothing identifying the unique point then there is nothing that can be used to coordinate changes that may occur.

However, as shown below in Table 2 which depicts a typical flight mission that can contains both a unique Mission ID and waypoint IDs that correspond to all of the waypoints in the mission flight plan.

TABLE 2

Operational Details of a Mission Flight Plan with a Mission ID and with Waypoint IDs.

Mission ID = 0.610427115.0

| Latitude | Longitude | Altitude | Heading | Waypoint ID |
|---|---|---|---|---|
| 31.993288 | 34.793873 | 60 | 103 | 0.220219302 |
| 31.993449 | 34.79396 | 60 | 126 | 0.952920673 |
| 31.993569 | 34.794112 | 60 | 148 | 0.521658655 |
| 31.993631 | 34.794307 | 60 | 171 | 0.982182364 |
| 31.993624 | 34.794515 | 60 | −167 | 0.081150119 |
| 31.99355 | 34.794704 | 60 | −144 | 0.968588722 |

Table 2 shows that in addition to those operational details depicted in Table 1 each location point can now be uniquely identified. Now in the event that if the user, at a programming controller (PC), were to select the mission flight plan identified as Mission ID=0.610427115.0 to be performed by the UAV, and if the UAV communicated to the PC in response to the PC query that the Mission ID=0.610427115.0 was already in the memory of the UAV then there would be no need to upload Mission ID=0.610427115.0 from the PC to the UAV. Thus programming the UAV to perform Mission ID=0.610427115.0 would not be necessary and thereby save a considerable amount of time for uploading the entire Mission ID=0.610427115.0.

Taking this idea a step further, if, for example an operational procedures to allow the UAV to reach a new waypoint added to the mission flight plan between 2 adjacent scheduled waypoints, then the original mission flight plan corresponding to Mission ID=0.610427115.0 could still be used as illustrated between the differences in Table 2 and Table 3 in order to evaluate any differences by using the Mission IDs in the PC and in the UAV as a basis for the comparison.

TABLE 3

Operational details a slightly modified mission flight plan.

Mission ID = 0.610427115.1

| latitude | longitude | altitude | heading | Waypoint ID |
|---|---|---|---|---|
| 31.993288 | 34.793873 | 60 | 103 | 0.220219302 |
| 31.993449 | 34.79396 | 60 | 126 | 0.952920673 |
| 31.993569 | 34.794112 | 60 | 148 | 0.521658655 |
| 31.993421 | 34.794845 | 60 | 155 | 0.095735857 |
| 31.993631 | 34.794307 | 60 | 171 | 0.982182364 |
| 31.993624 | 34.794515 | 60 | −167 | 0.081150119 |
| 31.99355 | 34.794704 | 60 | −144 | 0.968588722 |

For example as depicted in Table 3, a mission flight plan that already exists in a PC can be slightly modified in the PC to only add a new waypoint ID between two previously adjacently sequenced waypoints along with a new set of corresponding sequential destination operations (i.e., the newly inserted latitude, longitude, altitude and heading). As highlighted in bold the newly inserted operational details correspond to a new waypoint ID and that the prior existing mission ID has also been slightly modified to correspond to a new version of this particular modified updated mission flight plan.

In this exemplary situation, as outlined by the differences between Tables 2 and 3, as before the PC contacts and queries the UAV to identify which Mission ID is stored in memory of the UAV and the UAV only has to report back to the PC the particular Mission ID currently stored in the memory of the UAV.

When the UAV reports back to the PC the particular Mission ID stored in the UAV, then the PC is able to determine that the updated flight mission (corresponding to Mission ID=0.610427115.1) in the PC (Mission ID=0.610427115.0) is not the same version. Since the memory in the PC contains multiple versions of the particular mission flight plans (i.e., corresponding to Mission IDs 0.610427115.0 and 0.610427115.1) then the PC app can then execute a comparison between these 2 Mission fight plan versions and subsequently identify and build a difference profile between the two different Mission flight plans. In this exemplary situation, this difference profile would comprise those corresponding to the sequential destination operations and the Waypoint ID depicted in the $4^{th}$ row of Mission ID=0.610427115.1 depicted in Table 3. The difference profile would then be used to as a basis for constructing instructions for reordering the sequence destination operations of the mission flight plan corresponding to Mission ID=0.610427115.0 (stored in the UAV) of the $4^{th}$, $5^{th}$ and $6^{th}$ rows into the respective $5^{th}$, $6^{th}$ and $7^{th}$ rows of the upgraded mission flight entitled Mission ID=0.610427115.1. Since instructing the UAV to update the existing mission flight plan entitled Mission ID=0.610427115.0 into the updated mission flight plan entitled Mission ID=0.610427115.1 by using this difference profile then this would be a relatively small change as opposed to uploading the entire mission flight plan entitled Mission ID=0.610427115.1 into the UAV from the PC. Upon receiving this difference profile instructions from the PC, the UAV is capable of being more rapidly re-configured to update and modify the mission flight plan.

Since this profile difference is a calculation it is also possible to revert to prior mission flight plan versions. For example, of the UAV, which now holds the mission flight plan corresponding to mission ID=0.610427115.1 was requested by the PC to fly mission flight plan corresponding to mission ID=0.610427115.0 then the upload application instructions could simply upload a difference profile that would allow the UAV to remove the sequential destination operation corresponding to the $4^{th}$ row mission ID=0.610427115.1 and thus the UAV could be rapidly converted to host mission ID=0.610427115.0.

Another innovation is that the UAV is also envisioned to be able to maintain a map of multiple versions of the mission flight plans and to recall different versions it might hold in memory as asked from by an application coded instruction.

This innovated idea could be further extended to individual waypoints within the mission. Allowing the mission flight plan to be updated in-place with only minimal information being sent to the UAV. In effect, the application performing the upload and the UAV would synchronize with each other in a similar fashion as present day personal computers synchronize files between different personal computers.

It is understood that personal computers are programmed to use a similar difference profiling techniques to maintain a point-in-time reference to disk information or installed applications. For example, in Microsoft Windows™ a "restore point" is created prior to any application software installation operation. This restore point is, in effect an ID the holds information that was changed during the installation of an application. Information such as files placed on disk, changes to configuration and registry database, etc., are all part of this restore point. If the user chooses to remove the application (perhaps because caused the personal computer to become unresponsive) then the user could open the restore point screen and ask MS Windows to revert the personal computer to the same state it was in prior to the offending installation.

Another example is how many systems handle backup. In this scenario, the information on a storage system (like SSD or hard drive) is treated similarly to any database. When the snap-shot for backup is taken the files saved into the backup are marked with an ID. During each backup, the information is queried and compared to the version in the backup storage and when differences are found the backup is updated and file system on the personal computer is tagged so that the files are known to be in sync.

The last and widespread use of this technology is used in high up-time, critical applications where data changes often and that the process of performing a backup may impact system performance. In this scenario, all data to be backed up is quickly tagged with a backup identifier and new/changes to the data are places into a secondary storage. This method leaves data scheduled to be backed up untouched and removed any chance that relational data could have the relationships corrupted as would be the case if data changes where allowed unmanaged. Using this technique of database backup operations, which previously would have required taking the database offline for hours can be done in minutes with the actual backup running in the background with very little down-time.

While this innovative idea may have minimal impact on smaller flight operations the time savings as operations become larger and more complex can lead to a significant time savings and where operations are unchanged (and do not need a sync process) the savings is nearly 100% of the time for uploading the mission.

One scenario of the logical flow of how the present innovation can be used is that first some application, tool, etc is used to create the flight mission plan and any associated operations needed to complete the automated flight. Next the mission is copied or in some way placed or made available to the system responsible to upload the mission onto the UAV (called the app). Then during the initial upload the app upload the mission to the UAV. In response to a successful upload the UAV will return an identifier that the app can use in the future to uniquely identify the mission. This will be referenced as mission version 1.

Another scenario of the logical flow of how the present innovation can be used is that the user selects a mission from the app to fly and sends the mission to upload into the UAV. Afterwards the $1^{st}$ part of the upload includes the mission identifier and as the app knows that the mission has not been edited the identifier is populated. Then the UAV checks and confirms that the mission (by ID) is present and responds back to the app that the mission is ready. This is because only the ID packet is needed the mission can begin without uploading the mission.

Yet another scenario of the logical flow of how the present innovation can be used is that the user selects a mission from the app to fly and sends the mission to upload into the UAV. The mission is edited (we will call this mission version 2). The $1^{st}$ part of the upload includes the mission identifier and as the app knows that the mission has been edited the identifier is populated and marked as version 2. Then the UAV checks and confirms that the mission (by ID) is present and responds back to the app that the mission is found including what version of the mission is available. Then the app, detecting that it has version 2 of the mission and the UAV has version 1 of the mission performs a difference calculation. This difference information is then uploaded to the UAV. Once the UAV has processed the difference information sends a confirmation to the app and flight can begin. As a result since only the difference information was transmitted then the time needed to initiate the flight is greatly lessened.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

What is claimed is:

1. A method of programming an unmanned aerial vehicle (UAV) to perform autonomous flight operations, the method comprising:

preparing, at a programming controller (PC), an updated mission flight plan (UMFP) that comprises an updated mission identification (UMID), updated sequential destination operations (USDOs), and updated waypoint identifications (UWIDs);

querying from the PC to the UAV to output a stored mission identification (SMID), wherein the UAV comprises a stored mission flight plan (SMFP) that comprises the stored mission identification (SMID), stored sequential destination operations (SSDOs), and stored waypoint identifications (SWIDs);

outputting from the UAV to the PC the SMID;

generating instructions, at the PC, for modifying the SMFP to match that of the UMFP when the outputted SMID does not match that the UMID;

uploading the generated instructions to the UAV from the PC for modifying the SMFP in the UAV to matches the UMFP in the PC; and enabling the UAV to perform autonomous flight operations in accordance to the SMFP when the PC determines that the outputted SMID matches that of the UMID.

2. The method of claim 1, wherein the PC is selected from the group consisting of a desktop computer, a laptop computer, a tablet computer, and a cell phone, and remote controller.

3. The method of claim 1, wherein each sequential destination operation (SDO) in the USDOs or SSDOs comprises latitude, longitude, altitude, and heading information.

4. The method of claim 1, wherein the UAV and the PC are configured to communicate to each other via wireless communication.

5. The method of claim 1, wherein the UAV is selected from the group consisting of a tricopter, a quadcopter, a hexcopter, an octacopter, and a fixed wing airplane.

6. A system for programming an unmanned aerial vehicle (UAV) to perform autonomous flight operations, the system comprising:

a programming controller (PC); and
the UAV,
wherein the PC is configured to prepare an updated mission flight plan (UMFP) that comprises an updated mission identification (UMID), updated sequential destination operations (USDOs), and updated waypoint identifications (UWIDs);

the UAV is configured to output a stored mission identification (SMID), wherein the UAV comprises a stored mission flight plan (SMFP) that comprises the stored mission identification (SMID), stored sequential destination operations (SSDOs), and stored waypoint identifications (SWIDs);

the PC is also configured to generate instructions for modifying the SMFP to match that of the UMFP when the outputted SMID does not match that the UMID;

the PC is also configured to upload the generated instructions to the UAV;

the UAV is configured to modify the SMFP in the UAV to matches the UMFP in the PC in accordance to the uploaded instructions to the UAV; and the UAV is configured to perform autonomous flight operations in accordance to the SMFP when the SMID is matches that of the UMID.

7. The system according to claim 6, wherein the PC is selected from the group consisting of a desktop computer, a laptop computer, a tablet computer, and a cell phone, and remote controller.

8. The system according to claim 6, wherein each sequential destination operation in the USDOs or SSDOs comprises latitude, longitude, altitude, and heading information.

9. The system according to claim 6, wherein the UAV and the PC are configured to communicate to each other via wireless communication.

10. The system according to claim 6, wherein the UAV is selected from the group consisting of a tricopter, a quadcopter, a hexcopter, an octacopter, and a fixed wing airplane.

* * * * *